United States Patent
Bang et al.

(10) Patent No.: US 7,557,869 B2
(45) Date of Patent: Jul. 7, 2009

(54) TOUCH PANEL INTEGRATED WITH LIQUID CRYSTAL DISPLAY

(75) Inventors: Yong Ik Bang, Taegu-Kwangyokshi (KR); Jae Bum Kim, Kumi-shi (KR); Tae H You, Incheon-Kwangyokshi (KR); Hee Jeong Park, Bucheon-shi (KR)

(73) Assignee: LG Display Co., Ltd., Seoul (KR)

( * ) Notice: Subject to any disclaimer, the term of this patent is extended or adjusted under 35 U.S.C. 154(b) by 704 days.

(21) Appl. No.: 10/742,802

(22) Filed: Dec. 23, 2003

(65) Prior Publication Data

US 2004/0135773 A1    Jul. 15, 2004

(30) Foreign Application Priority Data

Dec. 24, 2002   (KR) ................ 10-2002-0083301

(51) Int. Cl.
  *G02F 1/1335*   (2006.01)
(52) U.S. Cl. ................ 349/12; 349/58; 345/173
(58) Field of Classification Search .......... 349/12, 349/58; 345/173
  See application file for complete search history.

(56) References Cited

U.S. PATENT DOCUMENTS

| | | | | |
|---|---|---|---|---|
| 5,748,269 | A | * | 5/1998 | Harris et al. ............ 349/58 |
| 5,889,568 | A | * | 3/1999 | Seraphim et al. ......... 349/73 |
| 6,563,554 | B2 | * | 5/2003 | Okamoto et al. .......... 349/12 |
| 6,580,405 | B1 | * | 6/2003 | Yamazaki et al. .......... 345/7 |
| 6,771,327 | B2 | * | 8/2004 | Sekiguchi ................ 349/12 |
| 7,154,481 | B2 | * | 12/2006 | Cross et al. ............. 345/173 |
| 2006/0262236 | A1 | * | 11/2006 | Abileah ................. 349/12 |

FOREIGN PATENT DOCUMENTS

| | | |
|---|---|---|
| JP | 04-350621 | 12/1992 |
| JP | 05-224813 | 9/1993 |
| JP | 09-062442 | 3/1997 |
| JP | 09-146706 | 6/1997 |
| JP | 2002-323691 | 11/2002 |
| KR | 10-2001-0045767 A | 6/2001 |

* cited by examiner

*Primary Examiner*—David Nelms
*Assistant Examiner*—Nathanael R Briggs
(74) *Attorney, Agent, or Firm*—McKenna Long & Aldridge LLP

(57) ABSTRACT

A touch panel integrated with a liquid crystal display (LCD) includes an LCD panel, a touch panel arranged on the liquid crystal panel, and a transparent conductive film arranged between the LCD panel and the touch panel for substantially eliminating electromagnetic interference between the a common electrode signal of the LCD panel and the touch panel.

14 Claims, 4 Drawing Sheets

(a)

(b)

TOUCH PANEL INTEGRATED WITH LIQUID CRYSTAL DISPLAY

This application claims the benefit of Korean Application No. P2002-83301, filed on Dec. 24, 2002, which is hereby incorporated by reference for all purposes as if fully set forth herein.

BACKGROUND OF THE INVENTION

1. Field of the Invention

The present invention relates to touch panels. More particularly, the present invention relates to a touch panel integrated with liquid crystal display device driven according to a line inversion method.

2. Discussion of the Related Art

Touch panels have been developed as a means of efficiently interfacing with electronic devices via a display surface. For example, users may input desired information using a touch panel integrated with a display device while watching images displayed by the display device. Allowing users to easily input desired information to an electronic device via a display surface, touch panels substantially reduce or eliminate the need for other types of input devices (e.g., keyboards, mice, remote controllers, and the like) that tend to have higher rates of malfunction the touch panels replacing them. Currently, touch panels have been widely used as input devices integrated with, or added to, electronic devices such as computers, portable information devices, personal digital assistants (PDAs), and spherical or non-spherical display devices (e.g., liquid crystal display (LCD) devices, plasma display panel (PDP) devices, electroluminescence (EL) devices, cathode ray tubes (CRTs), etc.).

Depending on the type of contact object used (e.g., a user's finger, a stylus, etc.), and on the manner in which the location of a contact point (i.e., the location where the contact object is operably proximate the touch panel) is determined, touch panels are generally classifiable as analog resistive-type, digital resistive-type, capacitive-type, ultrasonic wave-type, and infrared-type touch panels.

Generally, analog resistive-type touch panels include an upper transparent substrate supporting an upper electrode and a lower transparent substrate supporting a lower electrode. The upper and lower transparent substrates are attached to each other and spaced apart from each other by a predetermined distance. When a surface of the upper transparent substrate is contacted by a contact object, the upper electrode formed on the upper transparent substrate electrically contacts the lower electrode formed on the lower transparent substrate. When the upper and lower electrodes electrically contact each other, a voltage, made variable by a resistance value or a capacitance value specific to the location of where the user touched the touch panel (i.e., the contact point), is then detected and outputted along with a location defined by coordinates of the contact point.

FIG. 1 illustrates a cross-sectional view of a related art touch panel integrated with an LCD device.

Referring to FIG. 1, the related art touch panel generally includes a lower polarizing plate 110, a lower substrate 120 of an LCD panel 100 provided on the lower polarizing plate 110, an upper substrate 130 of the LCD panel 100 provided over the lower substrate 120 of the LCD panel 100, an upper polarizing plate 140 provided on the upper substrate 130, a lower substrate 210 of a touch panel 200 provided on the upper polarizing plate 140, and an upper substrate 220 of the touch panel 200 provided over the lower substrate 210 of the touch panel 200. A case top 300 is provided at a side of the structure described above and arranged over a periphery of the touch panel 200. Generally, the upper substrate 130 and the lower substrate 120 include a color filter array (not shown) and a thin film transistor array (not shown), respectively. Further, a liquid crystal layer (not shown) is provided between the substrates 120 and 130.

FIG. 2 illustrates a plane view of the related art touch panel 200 shown in FIG. 1. FIG. 3 illustrates a cross-sectional view taken along line I-I' of FIG. 2.

Referring to FIG. 2, the related art touch panel 200 generally includes a viewing area (VA) having dimensions corresponding to a display surface of an LCD device and a dead space region (DS) formed to surround the periphery of the viewing area (VA).

Referring to FIG. 3, the upper and lower substrates 220 and 210 are each formed of a PET (polyethylene terephtalate) film and are adhered together via an insulating glue 230 arranged within the dead space region (DS). The insulating glue 230 is provided to a predetermined thickness for spacing the upper and lower substrate 220 and 210 apart to a predetermined thickness. Transparent electrodes 221 and 211 are provided on opposing inner surfaces of the upper and lower substrates 220 and 210, respectively, and have dimensions corresponding to dimensions of the viewing area (VA). A signal line 240 connects to one of the upper and lower transparent electrodes 221 and 211 within the dead space region (DS) and extends outside the touch panel 200. Accordingly, the signal line 240 transmits a voltage to one of the transparent electrodes 221 and 211 and receives a voltage made variable based on the location of the contact point. A plurality of dot spacers 250, formed of an insulative synthetic resin (e.g., epoxy or acrylic acid resin), are uniformly arranged on the lower transparent electrode 221 to prevent the upper and lower transparent electrodes 221 and 211 from electrically contacting each other in the presence of inadvertent or otherwise insufficient contact pressure.

During operation of the resistive-type touch panel, the transparent electrodes 221 and 211 electrically contact each other at a contact point when a contact object (e.g., a pen, a finger, etc.) touches a predetermined location (i.e., a contact point) of the upper substrate 220 with a pressure equal to an operating pressure. Accordingly, a voltage, made variable by a resistance value specific to the contact point, is outputted through the signal line 240. However, when the contact area touches the upper substrate 220 with a pressure less than an operating force, the dot spacers 250 prevent the upper and lower transparent electrodes 221 and 211 from electrically contacting each other.

FIG. 4 illustrates a cross-sectional view of the LCD panel 100 shown in FIG. 1.

Referring to FIG. 4, the LCD panel 100 typically includes upper and lower substrates 130 and 120 attached to, and spaced apart from, each other and a liquid crystal layer 150 provided between the upper and lower substrates 130 and 120.

The upper substrate 130 includes a shielding layer 131 for preventing light from being transmitted from the LCD panel in areas outside pixel regions, a color filter layer 132 for enabling red (R), green (G), and blue (B) colors to be displayed, a common electrode 133 for enabling pictures to be displayed.

The lower substrate 120 includes a plurality of gate lines (not shown), a plurality of data lines (not shown) crossing the plurality of gate lines, a plurality of pixel regions arranged in a matrix pattern defined by crossings of the gate and data lines, a plurality of pixel electrodes provided in the plurality of pixel regions, and a plurality of thin film transistors (TFTs)

connected to corresponding ones of the gate lines, data lines, and pixel electrodes, for switching data signals, generated by a data driver (not shown) and applied to data line, to a pixel electrode in the presence of a signal applied to a gate line.

Generally, each TFT includes a gate electrode 121 provided on the lower substrate 120, a gate insulating film 122 provided over the lower substrate and on the gate electrode 121, a semiconductor layer 123 provided on the gate insulating film 122 over the gate electrode 121, and source/drain electrodes 124a and 124b provided at opposing sides of the semiconductor layer 123. A protective layer 125 is provided over the lower substrate 120 and on the semiconductor layer 123 and source/drain electrodes 24a and 24b. A pixel electrode 126 is provided on the protective layer 125 and is electrically connected to the drain electrode 24b.

The upper and lower substrates 130 and 120 are uniformly spaced apart from each other by spacers (not shown) and are bonded to each other via seal material (not shown). The seal material includes a hole that facilitates the injection of liquid crystal 150 between the bonded upper and lower substrates 130 and 120.

During operation, the aforementioned related art LCD applies picture signals to pixel electrodes connected to corresponding TFTs in receipt of scanning signals are applied from a gate line. When the picture signals are applied to the pixel electrodes, an electric field is generated between the pixel electrode and the common electrode 133. Subsequently, the orientation of molecules within the liquid crystal 150 become altered in the presence of the generated electric field. Upon altering the orientation of the liquid crystal molecules, pictures are thus displayed. However, the liquid crystal material 150 can become damaged if it is exposed to a DC electric field for an excessive amount of time. Accordingly, the polarity of the generated electric field is changed periodically during driving of the LCD device to prevent the liquid crystal from becoming damaged, wherein the polarity of the generated electric field corresponds to the polarity of data signal voltages applied from data lines to the pixel electrodes.

Such driving is referred to as polarity inversion driving and includes frame inversion (wherein the polarity of the electric field is inverted every frame period), line inversion (wherein the polarity of the electric field is inverted for every horizontal line of pixel regions), column inversion (wherein the polarity of the electric field is inverted for every vertical line of pixel regions), and dot inversion (wherein the polarity of the electric field is inverted both for every horizontal line and vertical line of pixel regions).

Driving LCD devices using the line inversion driving method, and by providing an AC voltage to the common electrode 133, reduces the degree to which the LCD flickers as compared with the frame inversion driving method and requires less power than the dot inversion driving method. Accordingly, LCD devices are commonly driven according to the line inversion method.

FIG. 5 illustrates a method by which an LCD device is driven according to the line inversion method.

Referring to FIG. 5, and as mentioned above, when LCD devices are driven according to a line inversion method, the polarity of the generated electric field is inverted for every horizontal line of pixel electrodes, wherein the polarity of the electric field within each pixel region is inverted between successive frame periods (e.g., n and n+1). For example, during the $n^{th}$ period, electric fields having a positive polarity are generated within odd numbered horizontal lines of pixel regions and electric fields having a negative polarity are generated within even numbered horizontal lines of pixel regions. During the $(n+1)^{th}$ period, electric fields having a negative polarity are generated within odd numbered horizontal lines of pixel regions and electric fields having a positive polarity are generated within even numbered horizontal lines of pixel regions. Accordingly, the polarity of data signal voltages applied to pixel electrodes within adjacent horizontal lines are opposite each other.

By driving LCD devices according to the line inversion method, a brightness deviation between horizontal lines is smaller than the frame inversion methods. Due to spatial averaging, LCD devices driven according to the line inversion method flicker less than those driven according to the frame inversion method. Moreover, the opposite polarity voltages are vertically distributed through the LCD device. As a result, coupling phenomena generated between data signal voltages are offset and vertical cross talk is reduced compared to the frame inversion method.

FIGS. 6a and 6b illustrate output waveforms of data drivers used to drive LCD devices according to dot inversion and line inversion methods, respectively.

Referring to FIGS. 6a and 6b, compared to the output range of data signals outputted in a dot inversion method (as shown in FIG. 6a), the output range of data signals outputted in a line inversion method (as shown in FIG. 6b) can be reduced because the polarity of the voltage applied to the common electrode can be inverted in correspondence with the polarity of data signal voltages applied to the horizontal line being driven. More specifically, in driving LCD devices according to the line inversion method, the polarity of the common voltage is made to be opposite the polarity of the pixel signal voltage.

Aside from the aforementioned benefits obtained from driving LCD devices according to the line inversion method, problematic generation of horizontal cross talk is generated using the line inversion method. Moreover, as the switching frequency increases between each frame, the power consumption of the LCD device increases. Further, when the related art touch panel, having the lower transparent electrode 211, is integrated with the aforementioned related art LCD device, driven according to the line inversion method, a parasitic capacitor is undesirably formed.

More specifically, first and second electrodes of the parasitic capacitor include the common electrode 133 of the LCD device 100 and the lower transparent conductive film 211 of the touch panel 200, respectively, separated by an interposing dielectric structure that includes the upper polarizing plate 140 and the upper substrate 130. Accordingly, the AC signals applied to the common electrode 133 in applying the line inversion method, undesirably interfere with and distort voltages applied to, and transmitted from, the touch panel 200.

For example, where the touch panel 200 is provided as the aforementioned resistive-type touch panel described above with respect to FIG. 3, voltages indicative of the location of the contact point are applied to the lower transparent conductive film. However, due to the electromagnetic interference generated by the AC signal applied to the common electrode 133, the exact location of the contact point generated on the touch panel 200 is impossible to be determined detect a contact area on the touch panel.

Where, however, a capacitive-type touch panel having a glass reinforcing film laminated to a transparent conductive film is integrated with the LCD device 100, a parasitic capacitance is generated between the common electrode 133 and the transparent conductive film. Similar to the manner in which the AC signal applied to the common electrode 133 interferes with signals of the resistive-type touch panel, the AC signal applied to the common electrode 133 electromagnetically interferes with voltage signals transmitted by metal electrodes provided at corners of the transparent conductive film used to form an equipotential field and to detect the location of the contact point.

Moreover, where an electromagnetic (EM)-type touch panel, having a sensor board and an electronic pen, is integrated with the LCD device 100, the AC signal applied to the common electrode 133 electromagnetically interferes with the detection of a generated contact point. More specifically, the sensor board of the EM-type touch panel is provided at a rear surface of the LCD for generating electromagnetic fields and a control board for detecting the location of generated contact points based upon the interaction of the electronic pen and the generated electromagnetic field. Accordingly, the AC signal applied to the common electrode 133 interferes with the interaction between the generated electromagnetic field and the electronic pen.

SUMMARY OF THE INVENTION

Accordingly, the present invention is directed to a touch panel integrated with a liquid crystal display panel that substantially obviates one or more of the problems due to limitations and disadvantages of the related art.

An advantage of the present invention provides a touch panel integrated with a liquid crystal display (LCD) panel capable of preventing electromagnetic interference from being generated by a common electrode of the LCD panel driven according to a line inversion method.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, the touch panel integrated with the liquid crystal display panel may, for example, include a liquid crystal display (LCD) panel, a touch panel arranged on the liquid crystal panel, and a transparent conductive film arranged between the LCD panel and the touch panel.

In one aspect of the present invention, the transparent conductive film may be provided as a material suitable for electromagnetic wave shielding (e.g., indium oxide, tin oxide, zinc oxide, indium-tin oxide, indium-zinc oxide, silver, silver alloy, copper, copper alloy, gold, etc., and combinations thereof).

In another aspect of the present invention, the transparent conductive film may be provided as a single layer.

In still another aspect of the present invention, the transparent conductive film may be provided as a laminate of two or more layers.

In yet another aspect of the present invention, the transparent conductive film may be electrically grounded.

In a further aspect of the present invention, the LCD panel may be driven according to a line inversion method.

In still a further aspect of the present invention, the LCD panel may be provided as a TN mode LCD panel.

In yet a further aspect of the present invention, the touch panel may comprise a resistive-type touch panel.

In still a further aspect of the present invention, the touch panel may comprise a capacitive-type touch panel.

In a further aspect of the present invention, the touch panel may comprise an EM-type touch panel.

In yet another aspect of the present invention, the LCD panel may, for example, include an upper polarizing plate arranged between the touch panel and the transparent conductive film; a lower polarizing plate arranged on a lower surface of the LCD panel; and fixing members for fixing the LCD panel with respect to the touch panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

According to principles of the present invention, substantially any type of touch panel (e.g., resistive-type, capacitive-type, and EM-type, etc.) may be integrated with a TN mode liquid crystal display (LCD) panel driven according to a line inversion method.

Figure 1:
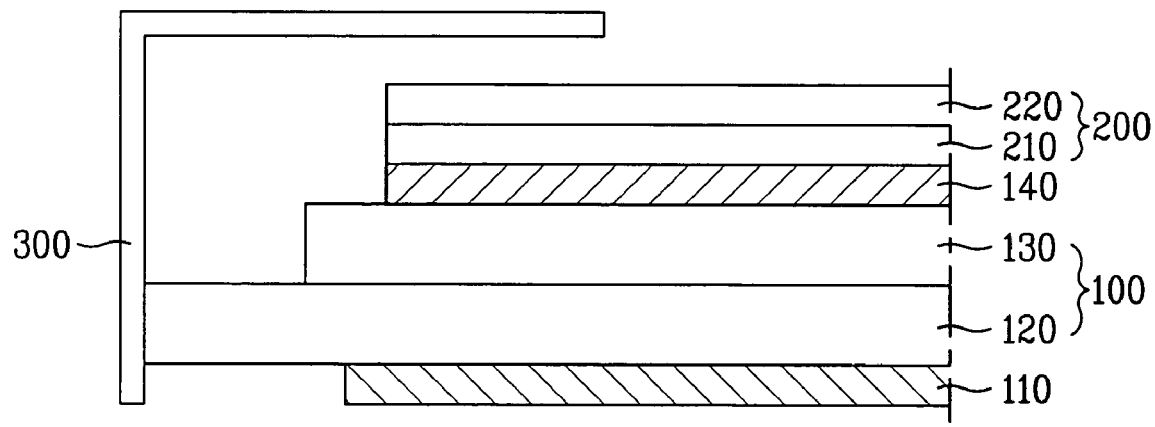
FIG. 1 illustrates a cross-sectional view of a related art touch panel integrated with an LCD device.
Figure 2:
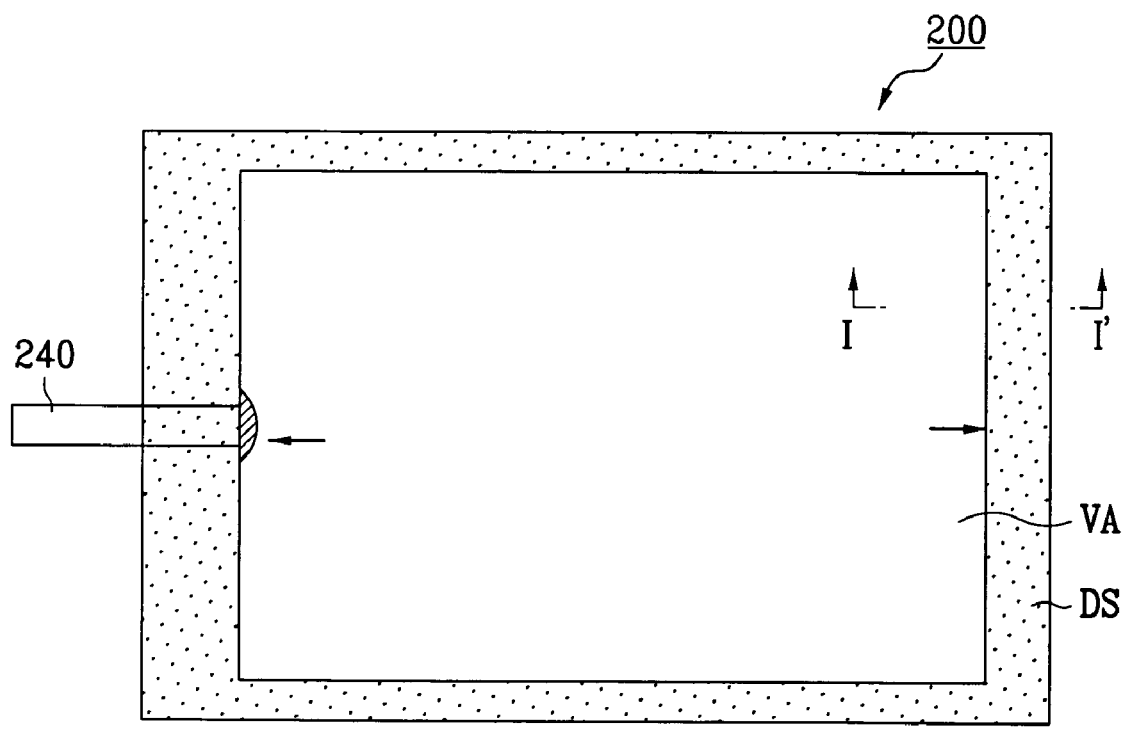
FIG. 2 illustrates a plane view of the related art touch panel 200 shown in FIG. 1.
Figure 3:
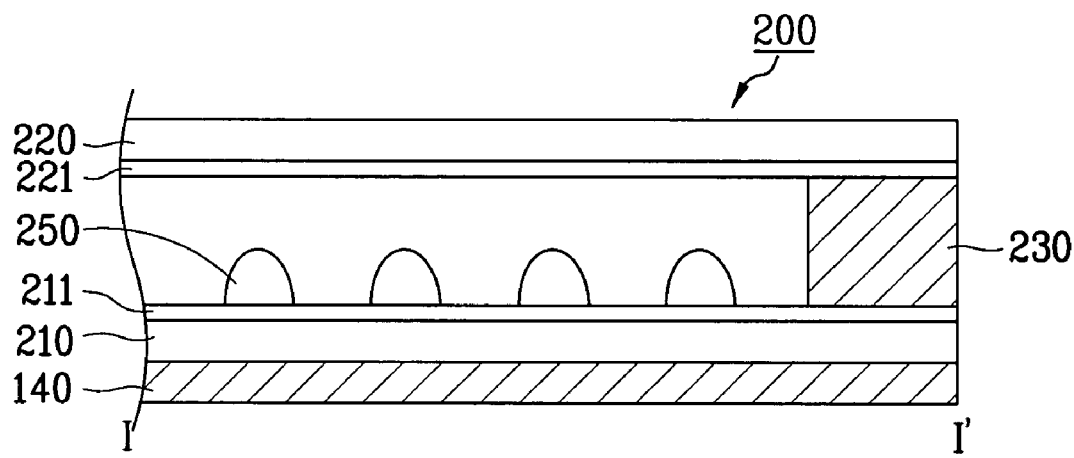
FIG. 3 illustrates a cross-sectional view taken along line I-I' of FIG. 2.
Figure 4:
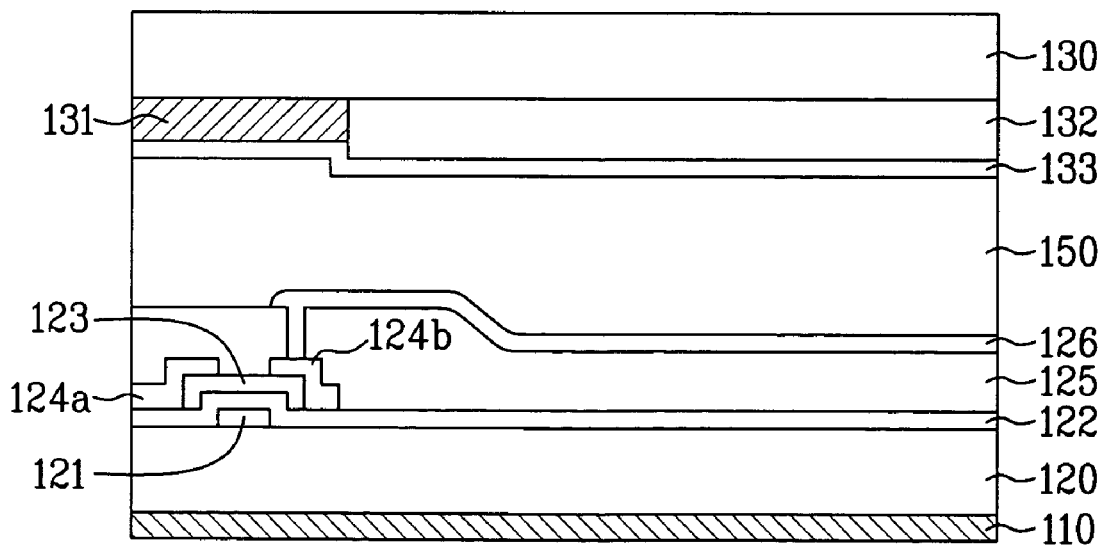
FIG. 4 illustrates a cross-sectional view of the liquid crystal display (LCD) panel 100 shown in FIG. 1.
Figure 5:
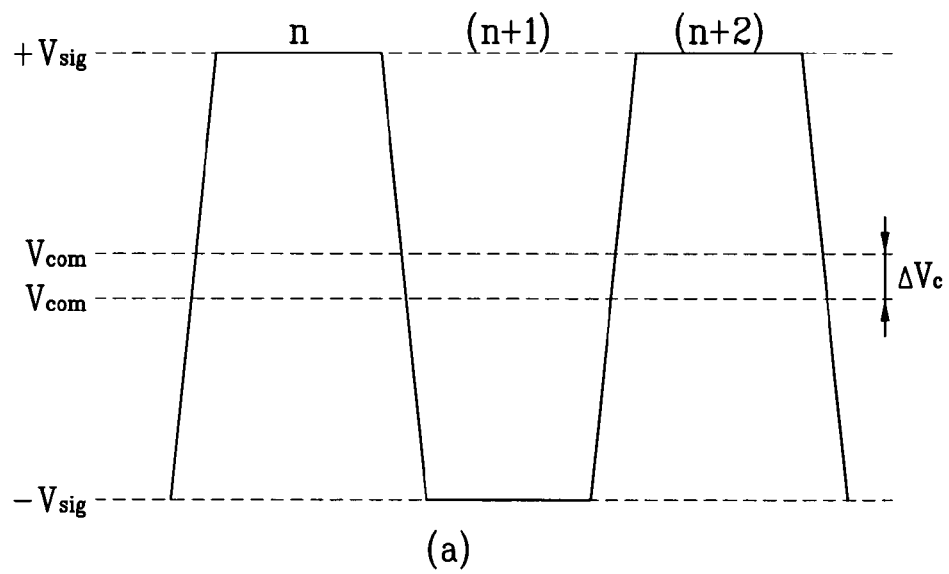
FIG. 5 illustrates a method by which an LCD device is driven according to the line inversion method.
Figure 6:
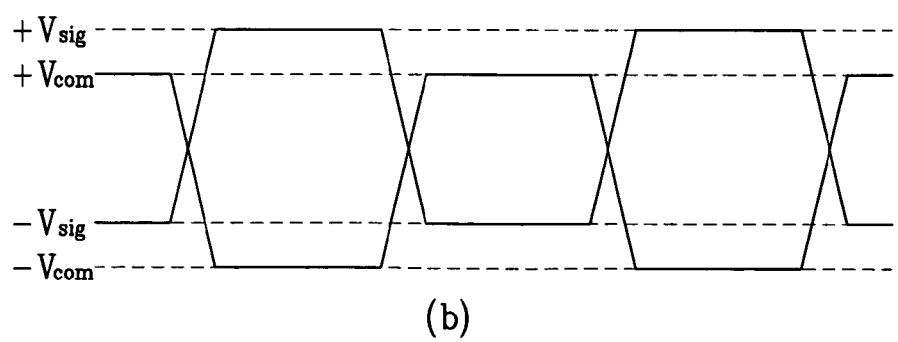
FIGS. 6a and 6b illustrate output waveforms of data drivers used to drive LCD devices according to dot inversion and line inversion methods, respectively.
Figure 7:
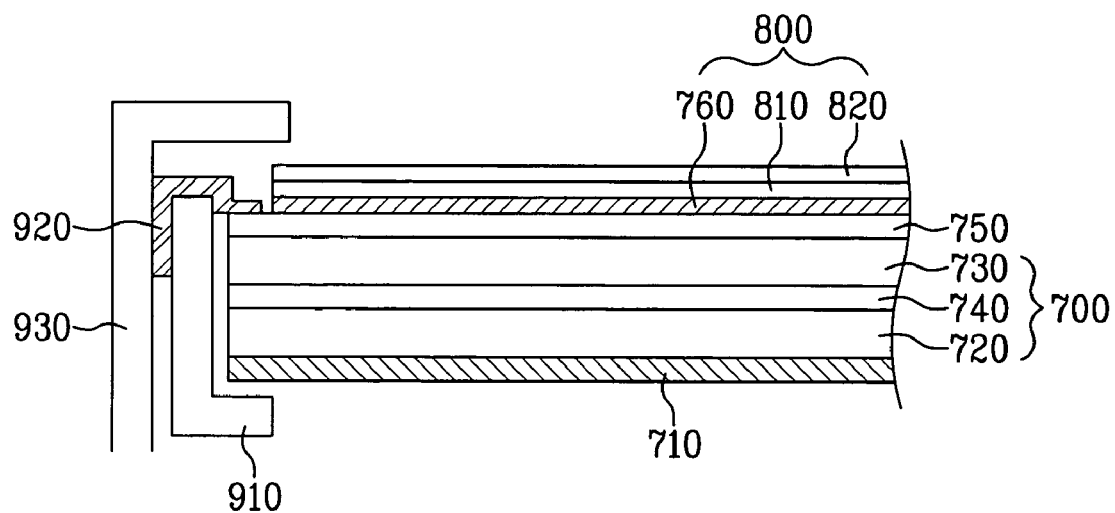
FIG. 7 illustrates a cross-sectional view of a touch panel integrated with an LCD according to principles of the present invention.

FIG. 7 illustrates a cross-sectional view of a touch panel integrated with an LCD according to principles of the present invention.

According to principles of the present invention, a touch panel 800 may be integrated with a LCD device having an LCD panel 700.

In one aspect of the present invention the LCD device may, for example, include a lower polarizing plate 710; a lower substrate 720 of the LCD panel 700 arranged on the lower polarizing plate 710, wherein the lower substrate 720 may, for example, include a thin film transistor array; an upper substrate 730 of the LCD panel 700 arranged over the lower substrate 720, wherein the upper substrate 730 may, for example, include a color filter array; a liquid crystal layer 740 arranged between the upper and lower substrates 730 and 720; a transparent conductive film 750 arranged over the upper substrate 730 (e.g., directly on the upper surface of the upper substrate 730) for shielding at least one of the LCD panel 700 and the touch panel 800 from electromagnetic waves generated by the other of the touch panel 800 and the LCD panel 700, respectively; and an upper polarizing plate 760 provided on the transparent conductive film 750.

In one aspect of the present invention, the transparent conductive film 750 may be provided as a material suitable for electromagnetic wave shielding (e.g., indium oxide, tin oxide, zinc oxide, indium-tin oxide, indium-zinc oxide, silver, silver alloy, copper, copper alloy, gold, etc., and combinations thereof). In another aspect of the present invention, the transparent conductive film 750 may be provided as a single electrically conductive layer. In still another aspect of the present invention, the transparent conductive film 750 may be provided as a laminate of two or more electrically conductive layers.

In one aspect of the present invention, the touch panel 800 may, for example, include a lower substrate 820 arranged on the upper polarizing plate 760; and an upper substrate 820 arranged over the lower substrate 810.

According to principles of the present invention, a main support 910 may be provided proximate the touch panel 800 integrated with the LCD panel 700 for supporting the LCD panel 700, a conductive adhesive 920 coupled between an end peripheral portion of the main support 910 and a peripheral portion of the transparent conductive film 750; and a case top 930 connected to the conductive adhesive 920 for covering and supporting a side portion of the structure including at least the touch panel 800 and LCD panel 700. In one aspect of the present invention, the case top 930 may include a conductive material.

In one aspect of the present invention, the conductive adhesive 920 may for, example, include an electrically conductive material such as aluminum, copper, or the like. According to principles of the present invention, the conductive adhesive 920 may discharge static electricity charged within the transparent conductive film 750 through the case top 930.

According to principles of the present invention, the touch panel 800 may be provided as a resistive-type touch panel. Accordingly, the resistive-type touch panel 800 may, for example, include upper and lower substrates 820 and 810, respectively, bonded to each other. In one aspect of the present invention, interior opposing surfaces of the upper and lower surfaces 820 and 810 may be substantially uniformly spaced apart from each other via a plurality of dot spacers (not shown). Moreover, first and second transparent conductive films (not shown) may be provided on the interior opposing surfaces of the upper and lower substrates 820 and 810. In one aspect of the present invention, voltage signals may be transmitted to and away the first and second transparent conductive films of the touch panel 800 through a signal line.

According to principles of the present invention, the touch panel 800 may be provided as a capacitive-type touch panel. Accordingly, the capacitive-type touch panel 800 may, for example, include an electrically insulative transparent substrate (e.g., glass, etc.); a transparent conductive film arranged on the electrically insulative transparent substrate; and a plurality of metal electrodes arranged on the transparent conductive film for applying a substantially uniform electric field across a surface of the transparent conductive film. When a contact object is operably proximate the transparent conductive film of the touch panel 800 (e.g., either above or in direct contact with the transparent conductive film), some of the current within the generated electric field may be transferred to the contact object, thereby decreasing the current within the electric field. Subsequently, the current sensors coupled to the touch panel 800 may detect the decrease in the charge and, based on the relative differences in the detect current decrease at the corners of the of the touch panel 800, calculate the position of the contact object with respect to the touch panel 800 (i.e., the contact point). According to principles of the present invention, the transparent conductive film 750 may substantially prevent electromagnetic signals transmitted by the common electrode 733 from being transmitted to the touch panel 800.

According to principles of the present invention, the touch panel 800 may be provided as an electromagnetic (EM)-type touch panel. Accordingly, the EM-type touch panel 800 may, for example, include an electronic pen having an LRC circuit, a sensor board provided at a rear surface of the LCD panel 700 for generating electromagnetic waves, and a control board for determining the location of a contact point based upon the interaction of the electronic pen and the electromagnetic waves generated by the sensor board. Electromagnetic signals, generated by the common electrode of the LCD panel 700, are prevented from being transmitted to the EM-type touch panel 800 due to the presence of the transparent conductive film 750 on the upper substrate 730 and electrically grounded to the case top 930 via the conductive adhesive 920.

As is evident from the discussion above, regardless of the type of touch panel 800 that may be integrated with the LCD panel 700, driven by substantially any method, due to the presence of the conductive transparent film 750. More specifically, the conductive transparent film 750 may electromagnetically shield signals generated within the LCD panel 700 from interfering with signals generated by the touch panel 800. In one aspect of the present invention, the transparent conductive film 750 may be formed directly on the upper surface of the upper substrate 730 while the common electrode 733 may be provided on the lower surface of the upper substrate 730. In another aspect of the present invention, electromagnetic signals generated by AC voltage signals applied to the common electrode 733 may be discharged from the upper surface of the upper substrate through the transparent conductive film 750, the conductive adhesive 920, and the case top 930.

Figure 8:
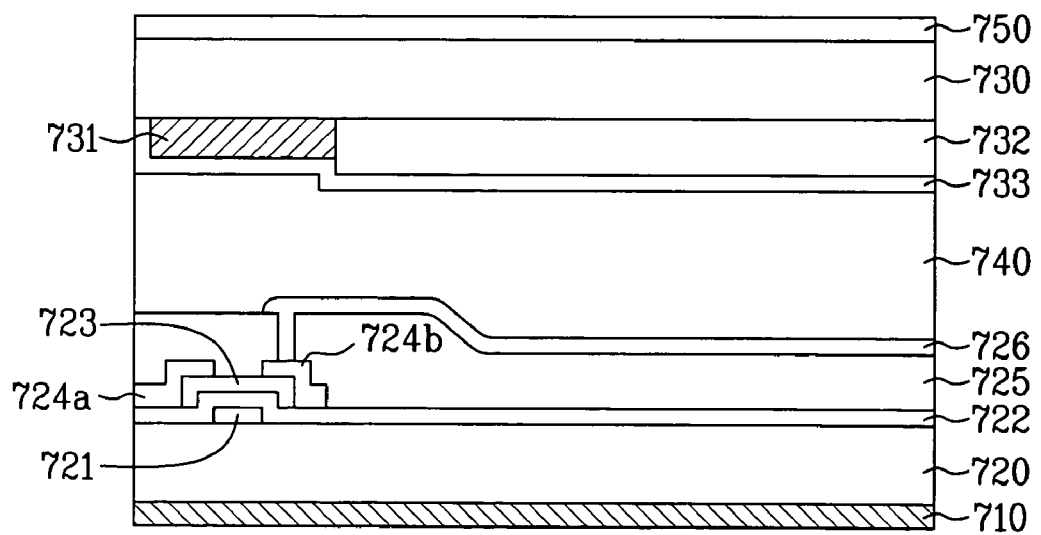
FIG. 8 illustrates a cross-sectional view of the liquid crystal display LCD panel 700 shown in FIG. 7.

FIG. 8 illustrates a cross-sectional view of the LCD panel 700 shown in FIG. 7.

Referring to FIG. 8, the upper substrate 730 of the LCD panel 700 may, for example, support a light shielding layer 731 for preventing light from being transmitted in areas outside pixel regions and a color filter layer 732 arranged within predetermined pixel regions for enabling R, G, and B colors to be displayed.

The lower substrate 720 of the LCD panel 700 may, for example, support a plurality of gate lines (not shown) spaced apart from each other by a predetermined distance and extending over the lower substrate 720 along a first direction, a plurality of data lines (not shown) spaced apart from each other by a predetermined distance and extending over the lower substrate 720 along a second direction, substantially perpendicular to the first direction to cross the plurality of gate lines, and a plurality of thin film transistors (TFTs) arranged at crossings of the gate and data lines. In one aspect of the present invention, each TFT may, for example, include a gate electrode 721 projected from a gate line (not shown), a gate insulating film 722 arranged over the lower substrate 720 and on the gate electrode 721, a semiconductor 723 arranged on the gate insulating film 722 and over the gate electrode 721, source and drain electrodes 724a and 724b, respectively, arranged over opposing sides of the semiconductor layer 723. Moreover, a passivation film 725 may be arranged over the lower substrate 720 and the structures arranged thereon. Additionally, pixel electrodes 726 may be arranged on the passivation film 725 and in electrical contact with corresponding ones of the drain electrodes 724b.

As described above, a touch panel may be integrated with a LCD device, wherein electromagnetic signals generated by the LCD device are substantially prevented from interfering with the operation of the touch panel. According to principles of the present invention, the transparent conductive film 750 is arranged between the upper substrate and the touch panel and is electrically grounded to substantially prevent common electrode signals of the LCD panel from electromagnetically interfering with signals transmitted to and from the touch panel. Accordingly, signals of the touch panel may be substantially prevented from becoming distorted due to operation of the LCD panel.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A touch panel integrated with a liquid crystal display (LCD) panel, comprising:
    an LCD panel having first and second substrates to face each other and a liquid crystal layer between the first and second substrates, wherein the first substrate has a common electrode on the whole surface of the first substrate and wherein the LCD panel is driven with a line inversion method;
    a touch panel operably arranged over the entire LCD panel;
    a case top covering and supporting a side of the LCD panel;
    a main support fixing the LCD panel with respect to the touch panel; and
    a transparent conductive film arranged between the LCD panel and the touch panel, the transparent conductive film substantially eliminating electromagnetic interference between the LCD panel and the touch panel, wherein the transparent conductive film is electrically grounded to the case top via a conductive adhesive material coupled to an end of a peripheral portion of the main support and a peripheral portion of the transparent conductive film and the transparent conductive film is directly on the upper surface of the LCD panel.

2. The touch panel integrated with the LCD panel of claim 1, wherein the transparent conductive film includes one of indium oxide, tin oxide, zinc oxide, indium-tin oxide, indium-zinc oxide, silver, silver alloy, copper, copper alloy and gold.

3. The touch panel integrated with the LCD panel of claim 1, wherein the transparent conductive film includes at least one electrically conductive layer.

4. The touch panel integrated with the LCD panel of claim 1, wherein the transparent conductive film includes a laminate of at least two electrically conductive layers.

5. The touch panel integrated with the LCD panel of claim 1, wherein the touch panel comprises one of a resistive-type touch panel, a capacitive-type touch panel and an electromagnetic (EM)-type touch panel.

6. The touch panel integrated with the LCD panel of claim 1, further comprising:
    an upper polarizing plate arranged between the touch panel and the transparent conductive film; and
    a lower polarizing plate arranged on a bottom surface of the LCD panel.

7. The touch panel integrated with the LCD panel of claim 1, wherein the conductive adhesive material includes copper or aluminum.

8. A touch panel integrated with a liquid crystal display (LCD) device, comprising:
    an LCD panel which is driven with a line inversion method, the LCD panel comprising:
        an upper substrate, the upper substrate supporting a color filter array and a common electrode;
        a lower substrate opposing the upper substrate, the lower substrate supporting a thin film transistor array; and
        a liquid crystal layer between the upper and lower substrates;
    an upper polarizing plate over the LCD panel;
    a lower polarizing plate below the LCD panel;
    a touch panel over the entire upper polarizing plate;
    a case top covering and supporting a side of the LCD panel;
    a main support for fixing the LCD panel, the upper polarizing plate, and the lower polarizing plate with respect to the touch panel; and
    a transparent conductive film between the upper polarizing plate and the touch panel, the transparent conductive film substantially eliminating electromagnetic interference between the LCD panel and the touch panel, wherein the transparent conductive film is coupled to the case top via an electrically conductive adhesive material between an end of a peripheral portion of the main support and a peripheral portion of the transparent conductive film, and the transparent conductive film is directly on the upper surface of the LCD panel.

9. The touch panel integrated with the LCD device of claim 8, wherein the electrically conductive adhesive includes copper or aluminum.

10. The touch panel integrated with the LCD device of claim 8, wherein the transparent conductive film includes one of indium oxide, tin oxide, zinc oxide, indium-tin oxide, indium-zinc oxide, silver, silver alloy, copper, copper alloy and gold.

11. The touch panel integrated with the LCD device of claim 8, wherein the transparent conductive film includes at least one electrically conductive layer.

12. The touch panel integrated with the LCD device of claim 8, wherein the transparent conductive film includes a laminate of at least two electrically conductive layers.

13. The touch panel integrated with the LCD device of claim 8, wherein the LCD panel is a TN mode LCD panel.

14. The touch panel integrated with the LCD device of claim 8, wherein the touch panel is one of a resistive-type touch panel, a capacitive-type touch panel and an electromagnetic (EM)-type touch panel.

* * * * *